United States Patent
Müller et al.

(10) Patent No.: US 6,444,177 B1
(45) Date of Patent: Sep. 3, 2002

(54) PROCESS AND DEVICE FOR THE CATALYTIC CLEANING OF THE EXHAUST GAS FROM A COMBUSTION PLANT

(75) Inventors: Raimund Müller, Erlangen; Lothar Hofmann, Altenkunstadt; Kurt Schardt; Wieland Mathes, both of Michelau, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/995,646

(22) Filed: Dec. 29, 1997

Related U.S. Application Data

(63) Continuation of application No. PCT/DE96/01094, filed on Jun. 21, 1996.

(30) Foreign Application Priority Data

Jun. 28, 1995 (DE) .......................... 195 23 563

(51) Int. Cl.$^7$ .................... B01D 53/86; B01D 53/88; B01D 53/90
(52) U.S. Cl. .................... 422/177; 422/172; 422/180; 422/176
(58) Field of Search ................ 422/171–172, 422/176–177, 180; 55/523; 428/116, 593–594; 60/299, 300

(56) References Cited

U.S. PATENT DOCUMENTS

| | | | |
|---|---|---|---|
| 3,733,181 A | | 5/1973 | Tourtellotte et al. ........ 422/171 |
| 3,736,105 A | | 5/1973 | Tourtellotte et al. ........ 422/171 |
| 5,285,640 A | | 2/1994 | Olivo ......................... 422/171 |
| 5,393,587 A | * | 2/1995 | Machida et al. ............. 428/116 |
| 5,427,746 A | * | 6/1995 | Pereira et al. .............. 422/177 |
| 5,431,893 A | * | 7/1995 | Hug et al. .................. 423/235 |
| 5,455,097 A | * | 10/1995 | Machida et al. ............. 428/116 |
| 5,538,697 A | * | 7/1996 | Abe et al. .................. 422/171 |
| 5,814,284 A | * | 9/1998 | Schluter ..................... 422/171 |

FOREIGN PATENT DOCUMENTS

| | | | |
|---|---|---|---|
| DE | 4203807 A1 | | 9/1993 |
| DE | 4313861 | * | 11/1994 |
| DE | 4336632 A1 | | 1/1995 |
| EP | 558452 | * | 9/1993 |
| EP | 0558452 A1 | | 9/1993 |
| EP | 615777 | * | 9/1994 |

\* cited by examiner

*Primary Examiner*—Hien Tran
(74) *Attorney, Agent, or Firm*—Laurence A. Greenberg; Werner H. Stemer; Gregory L. Mayback

(57) ABSTRACT

Exhaust gas to be cleaned is introduced into a conversion and mixing duct and the exhaust gas flows through the duct along a predetermined longitudinal direction. A reducing agent, such as aqueous urea solution, is injected into the exhaust gas stream in the conversion and mixing duct. The exhaust gas stream is then deflected into a reaction duct which extends parallel to or coaxially around the conversion and mixing duct. The exhaust gas then flows in the opposite direction through the reaction duct. A reduction catalyst is disposed in the reaction duct, where the reducible components of the exhaust gas are reduced. The exhaust gas cleaned in this manner is then discharged from the reaction duct.

21 Claims, 6 Drawing Sheets

PROCESS AND DEVICE FOR THE CATALYTIC CLEANING OF THE EXHAUST GAS FROM A COMBUSTION PLANT

CROSS-REFERENCE TO RELATED APPLICATION

This is a continuation of copending international application PCT/DE96/01094, filed Jun. 21, 1996, which designated the United States.

BACKGROUND OF THE INVENTION

Field of the Invention

The invention pertains to a process for catalytically purifying the exhaust gas of a combustion plant fueled with solid, liquid or gaseous fuel. A liquid or gaseous reducing agent, such as aqueous urea solution or gaseous ammonia, is injected into the hot exhaust gas stream in the process. The injection is effected with an atomizing medium, such as compressed air. The reducing agent is thereupon decomposed and a catalytic reduction (in particular by the SCR method) with the hazardous gaseous exhaust gas components is induced. The invention further relates to a device for the catalytic cleaning of exhaust gas from a combustion plant.

The invention is used in the catalytic cleaning of exhaust gas, in particular by the SCR process, of engines and fired plants, e.g. diesel engines, diesel-gas engines, gas engines in the lean mode, boilers fired with oil, gas, wood and other fuels, and gas turbines which are provided, for example, for driving generators, compressors, commercial vehicles, machines, ships and locomotives or, for example, for generating heat, steam and hot water.

U.S. Pat. No. 5,431,893 to Hug et al. (EP-B1 0 558 452), in particular FIG. 1 thereof, discloses a process and a device of above-mentioned type for cleaning exhaust gases from combustion plants. The prior art device comprises a housing having three mutually parallel ducts or chambers. A feed line for the hot exhaust gases to be cleaned opens laterally into the first end of the first duct, which-is termed the pyrolysis duct. A two-component atomizing nozzle is disposed at the first end, roughly centrally. To this is fed a reactant, such as aqueous urea solution, and an atomizing medium, such as compressed air at a gauge pressure of 1 bar. The urea solution and the compressed air form an aerosol-like spray cone which is carried in the longitudinal direction of the pyrolysis duct. The urea is completely converted or broken down into finely divided ammonia and carbon dioxide. The exhaust gas stream containing the ammonia and the carbon dioxide passes, at the second end of the pyrolysis duct, into the second parallel duct, which is termed the mixing duct. The exhaust gas stream runs there in the opposite direction, more precisely through some conventional crossflow mixers. The exhaust gas stream, which is at that point homogeneously and intensively mixed with the broken-down reactant is subsequently passed into the third parallel duct, which is termed the reaction duct. There it is first conducted through two reduction catalysts which are spaced apart a given distance from one another, preferably SCR catalysts (SCR=selective catalytic reduction). Then it is optionally conducted through an oxidation catalyst, likewise arranged at a distance thereto, and constructed with the same geometry. The reduction catalysts and the optional oxidation catalyst are of a honeycomb structure, that is equipped with longitudinal ducts. The exhaust gas stream then freed from all gaseous pollutants then passes into a heat exchanger or exits via an outlet, e.g. a stack or exhaust.

That prior art device for cleaning exhaust gases can be constructed in a highly compact system because of the parallel arrangement of the three ducts. However, for many applications, a still more compact construction with the same performance is desirable. This requirement is due to the fact that available space is often very limited, such as, for instance, in the case of motor vehicles.

German patent application DE-A1 42 03 807 discloses an exhaust gas cleaning system with a centrally symmetrical structure. However, no deflection is effected in that system. Due to the relatively excessive length of that system, it cannot be used in all motor vehicle types, for example. A more compact structure would be desirable.

SUMMARY OF THE INVENTION

It is accordingly an object of the invention to provide a method and device for catalytically purifying exhaust gas from a combustion plant, which overcomes the above-mentioned disadvantages of the heretofore-known devices and methods of this general type and which allow for still more compact structures without sacrificing in terms of system performance.

With the foregoing and other objects in view there is provided, in accordance with the invention, a process for cleaning exhaust gas from a combustion plant fueled with solid, liquid, or gaseous fuel. The process comprises the following steps:

a) introducing exhaust gas into a combined conversion and mixing duct and forming an exhaust gas stream through the duct along a predetermined longitudinal direction;

b) injecting reducing agent into the exhaust gas stream flowing through the conversion and mixing duct, and mixing the reducing agent with the exhaust gas and simultaneously converting the reducing agent;

c) providing a reaction duct parallel to the conversion and mixing duct, and deflecting the exhaust gas stream from the conversion and mixing duct into the reaction duct and causing the exhaust gas to flow in a direction opposite the predetermined longitudinal direction;

d) contacting the exhaust gas with a reduction catalyst in the reaction duct and reducing reducible exhaust gas components of the exhaust gas; and e) discharging a stream of cleaned exhaust gas from the reaction duct.

The invention is based on the finding confirmed by testing that the first and second duct can, under certain boundary conditions, be functionally united, i.e., combined, to form a single duct, which is the combined conversion and a mixing duct. The combined duct may extend parallel to the reaction duct or inside the reaction duct (preferably centrally). A spatial separation into three ducts is therefore, surprisingly, not necessary for the proper function of the system.

In accordance with an added mode of the invention, the introducing step comprises forming a vortex flow in the exhaust gas stream upon introducing the exhaust gas into the combined conversion and mixing duct.

In accordance with an additional feature of the invention, the injecting step comprises injecting a reducing agent selected from the group consisting of liquid (e.g. aqueous urea solution) and gaseous (e.g. ammonia) reducing agents into the exhaust gas.

In accordance with another feature of the invention, the process further comprises a step of contacting the exhaust gas flowing in the reaction duct with an oxidation catalyst and/or contacting the exhaust gas with a hydrolysis catalyst.

With the above and other objects in view there is provided, in accordance with the invention, a device for cleaning exhaust gas originating from the combustion of solid, liquid, or aqueous fuel, comprising:

a housing having a combined conversion and mixing duct defined therein and being formed with an exhaust gas inlet for feeding exhaust gas into the conversion and mixing duct, the conversion and mixing duct defining a longitudinal direction along which the exhaust gas flows through the conversion and mixing duct;

a feed apparatus for injecting a reducing agent into the conversion and mixing duct;

the housing having a reaction duct formed therein extending substantially parallel to the conversion and mixing duct, and including a reducing catalyst disposed in the reaction duct;

a deflector disposed between the conversion and mixing duct and the reaction duct, the deflector deflecting the exhaust gas from the longitudinal direction in the conversion and mixing duct into an opposite direction in the reaction duct; and the housing being formed with an outlet for outflowing cleaned exhaust gas from the reaction duct.

In accordance with again an added feature of the invention, the reaction duct surrounds the conversion and mixing duct externally.

In accordance with again another feature of the invention, the feed apparatus is a two-component atomizing nozzle for aqueous urea and compressed air disposed centrally at the inlet of the conversion and mixing duct.

In accordance with again an additional feature of the invention, there is provided a further deflector disposed between the reaction duct and the outlet.

In accordance with again a further feature of the invention, there is provided an oxidation catalyst disposed in the reaction duct. Furthermore, a hydrolysis catalyst may be disposed in the housing upstream of the reduction catalyst, relative to a flow of the exhaust gas. The hydrolysis catalyst is disposed in the conversion and mixing duct, in the deflector, or in the reaction duct.

In accordance with yet an added feature of the invention, the conversion and mixing duct is disposed centrally within the reaction duct.

In accordance with yet an additional feature of the invention, the reduction catalyst (e.g. an SCR catalyst) is a catalytic converter formed with individual modules, and the conversion and mixing duct has a cross-section selected from the group consisting of rectangular, round, and rectangular with rounded corners. The individual modules have a parallelepiped and/or circular-segment cross section.

In accordance with yet another feature of the invention, the housing is formed with a prechamber disposed between the exhaust gas inlet in the housing and the conversion and mixing duct.

In accordance with yet a further feature of the invention, the conversion and mixing duct has an intake formed with at least two inlet orifices for the exhaust gas.

In accordance with yet a supplemental feature of the invention, the deflector(s) is provided with a catalytically active surface.

In accordance with yet another feature of the invention, there is provided a silencer in the reaction duct.

With the principle of this invention, the reaction duct can be arranged parallel and adjacent to the conversion and mixing duct ("parallel type"). However, in a particularly preferred embodiment, the conversion and mixing duct is arranged in the middle area, specifically centrally in the reaction duct ("central type"). Accordingly, a catalytic reactor configuration results in this invention with individual catalyst modules that make up the system. In the middle area—preferably centrally—the inner duct (the conversion and mixing duct) is formed through which the exhaust gas flows. The preferred catalytic reactor has catalyst modules arranged in p rows and in q columns and the middle area—preferably centrally—leaves free (m×n) catalyst modules to form the conversion and mixing duct. The variables m, n, p, and q are integers and m<p and n<q. The variables m and p pertain to the same direction (e.g. in the Cartesian system) and the variables n and q pertain to the same direction (orthogonal to m, p). According to another advantageous construction, a catalyst of circular ring shape is provided which is composed of a number of circular-segment catalyst modules whose inner region is provided to form a conversion and mixing duct of round cross section and which can be inserted into a housing of round external shape. In one specific configuration, the catalytic reactor body is rounded off externally, where parallelepiped and circular-segment modules are used.

By means of the device according to the invention, a particularly compact structure can be achieved, since only two mutually parallel ducts or only two ducts arranged one inside the other are required. The volume of the structure can therefore be kept small in relation to the catalyst volume. Owing to the highly simple, virtually symmetrical flow distribution in preferred embodiments, the construction principle can be retained for different sizes. There is therefore the potential for retaining the construction principle ("scale-up"), which is highly desirable for obvious cost reasons.

There is also provided, in accordance with the invention, a combination of the device for cleaning exhaust gas and a catalytic converter. The device has a combined conversion and mixing duct defined therein in which exhaust gas is mixed with a reducing agent injected into the conversion and mixing duct, a reaction duct extending substantially parallel to the conversion and mixing duct, and a deflector disposed between the conversion and mixing duct and the reaction duct, the deflector deflecting the exhaust gas from a flow direction in the conversion and mixing duct into an opposite flow direction in the reaction duct. The catalytic converter comprises a plurality of catalyst modules defining an inner duct in a middle area thereof, the exhaust gas flowing through the inner duct.

In accordance with another feature of the invention, the inner duct is disposed centrally within the plurality of catalyst modules.

In accordance with an additional feature of the invention, the modules are rectangular catalyst modules disposed in a checkered pattern along p rows and q columns, and wherein, in the middle area, m×n modules are omitted to form the inner duct, and wherein m, n, p, and q are integers, m<p, and n<q.

In accordance with again another feature of the invention, the modules are circular-segment catalyst modules defining a circular ring shape of the catalytic converter, wherein the inner duct has a round cross section, and wherein the catalytic converter is insertible into a housing having a round outer contour.

In accordance with a concomitant feature of the invention, the modules are a plurality of rectangular catalyst modules and a plurality of circular-segment catalyst modules defining a substantially rectangular catalytic converter with rounded corners.

Other features which are considered as characteristic for the invention are set forth in the appended claims.

Although the invention is illustrated and described herein as embodied in a process and device for the catalytic cleaning of the exhaust gas from a combustion plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
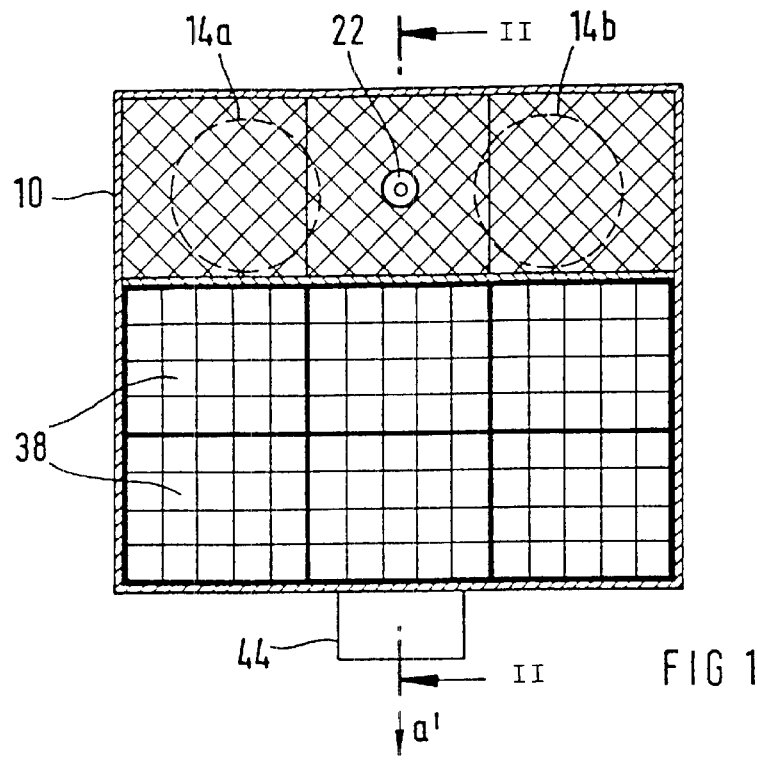
FIG. 1 is a cross section of a "parallel type" catalytic cleaning device with two parallel ducts, taken along the line I—I in FIG. 2, and viewed in the direction of the arrows.
Figure 2:
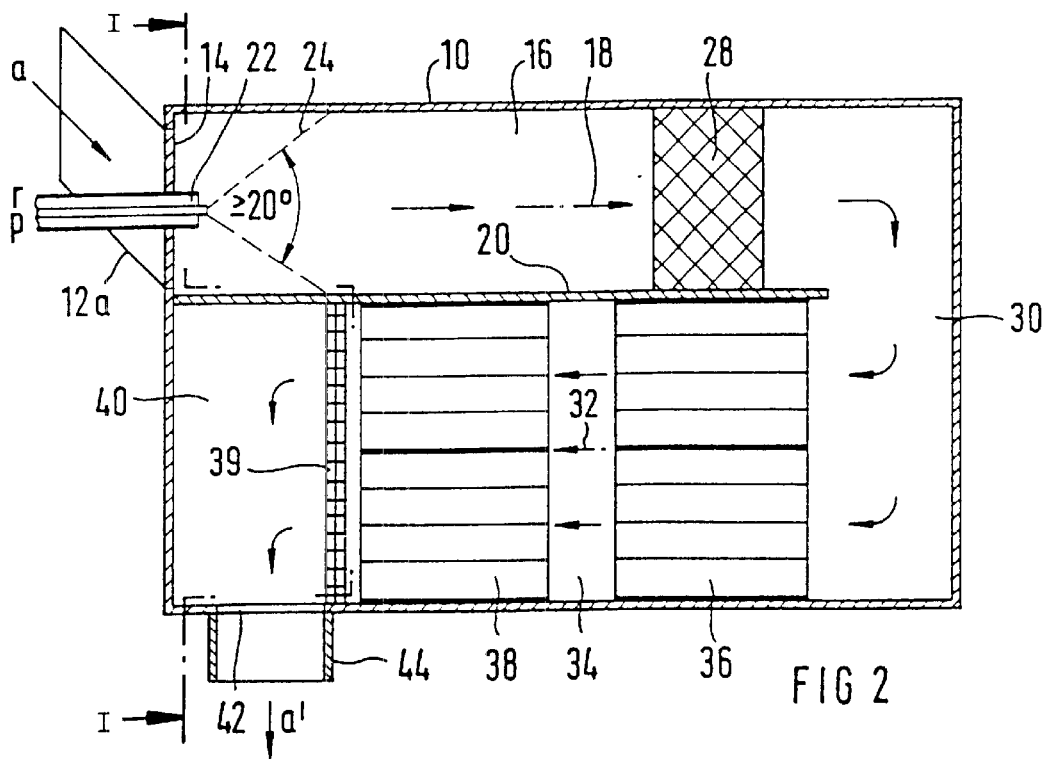
FIG. 2 is a longitudinal section of the cleaning device, taken along the line II—II of FIG. 1.

Referring now to the figures of the drawing in detail and first, particularly, to FIGS. 1 and 2 thereof, a device for catalytically purifying (cleaning) the exhaust gas a of a combustion plant has a parallelepipedal housing 10. Two feed lines 12a (only one of which is shown) for the exhaust gas a, which may have a temperature of 200 to 500° C., lead into this housing 10. For simplicity, only the exhaust gas feed line 12a is shown in FIG. 2. The second exhaust gas feed line cannot be seen in FIG. 2 because it is blocked by feed line 12a because the figure is symmetrically arranged about line II of FIG. 1 relative to gas feed line 12a.

Intake orifices 14a and 14b associated with the two exhaust gas feed lines 12a and 12b are shown in dashed lines for clarity in FIG. 1. The intake is generally identified at 14. The two intake orifices 14a, 14b lead into a wide, elongated injection chamber that will be referred to as a conversion and mixing duct the conversion and mixing duct 16 has a parallelepipedal cross section. Its longitudinal axis is designated 18. The two exhaust gas feed lines 12a, 12b are orientated obliquely to the longitudinal axis 18. In the exemplary embodiment, they are also orientated at an angle to the plane of the paper and in opposite directions. This generates an intake swirl in the inflowing exhaust gas a. A partition 20 extending in the longitudinal axis 18 also serves to define the conversion and mixing duct 16.

A two-component atomizer nozzle 22 (feed apparatus) is centrally situated at the inlet end of the conversion and mixing duct 16. The nozzle 22 is disposed symmetrically in between the two intake orifices 14a and 14b. It is operated with a reducing agent r (e.g. aqueous urea solution) and with an atomizing medium p (e.g. compressed air). The spray cone generated on operation is designated 24. The cone angle should be between 10° and 40°, preferably greater than 20°. The two-component atomizer nozzle 22 can be adapted in this case by selecting spray cone, mean droplet diameter, range of throw and evaporation section, in such a manner that a substantial conversion of the urea into ammonia, evaporation of the same and mixing with the inflowing exhaust gas a takes place in the conversion and mixing duct 16.

An optional hydrolysis catalytic converter 28 is disposed in the conversion and mixing duct 16. It will be appreciated that the catalytic converter 28 is provided when, as a result of the required minimum residence time of the urea and owing to other process parameters, the length of the combined conversion and mixing duct 16, to ensure complete reaction, would be too long. The hydrolysis catalyst 28 likewise effects a certain mixing of the inflowing substances, so that after its installation, the conversion and mixing duct 16 with a reduced length is sufficient. It is important that the urea is virtually completely converted into ammonia at the end of the conversion and mixing duct 16.

A first deflector 30 is disposed at the outflow end of the conversion and mixing duct 16. Non-illustrated deflection devices or deflection baffles may be provided in the first deflector 30. The first deflector 30 deflects the flowing substances by 180° and into the opposite flow direction 32.

The deflected substances enter a reaction duct 34. In this reaction duct 34, at least one reduction catalyst 36, preferably an SCR catalyst, is accommodated. Two reduction catalysts 36, 38 (catalyst blocks), arranged at a distance to one another, are installed there in the present case, through the longitudinal ducts of which the substances applied flow in the opposite direction 32. The reduction catalysts 36, 38 serve in this case in a known manner for the conversion of undesirable constituents or components of the exhaust gas a, but in particular for the destruction of the harmful nitrogen oxides $NO_x$.

It is important for the compact structure of the housing 10 that the flow along the longitudinal axis 18 of the exhaust gas a in the conversion and mixing duct 16 runs in the opposite direction to the direction of flow 32 in the reaction duct 34 and thus in the reduction catalysts 36, 38.

As shown in FIG. 1, the reduction catalyst 38 in this exemplary embodiment is made up of six identical modules placed one on top of the other, just as is the reduction catalyst 36.

The second reduction catalyst 38 can be followed with or without a spacing distance by an oxidation catalyst 39 of identical cross sectional dimensions. The oxidation catalyst 39 catalyzes the conversion of CO, $C_nH_n$ and other oxidizable exhaust gas constituents.

A second deflector 40 follows at the outlet of the reaction duct 34. This second deflection effects a deflection of 90° in the direction toward an outlet orifice 42, at which there is situated an outlet 44 for the cleaned exhaust gas a'.

It must be emphasized here once again: the conversion and mixing duct 16 serves here as evaporation, mixing and conversion section. No static mixers are present or required in this conversion and mixing duct 16 to mix the evaporating ammonia $NH_3$ intensively with the exhaust gas a. This is considered to be a significant advantage.

Nevertheless, reaction and uniform mixing of injected reducing agent r and exhaust gas a are ensured.

It is further important that the two exhaust gas feed lines 12a, 12b are arranged symmetrically about the longitudinal axis 18 of the conversion and mixing duct 16. This disposition results in good mixing of the components a, p and r.

Figure 3:
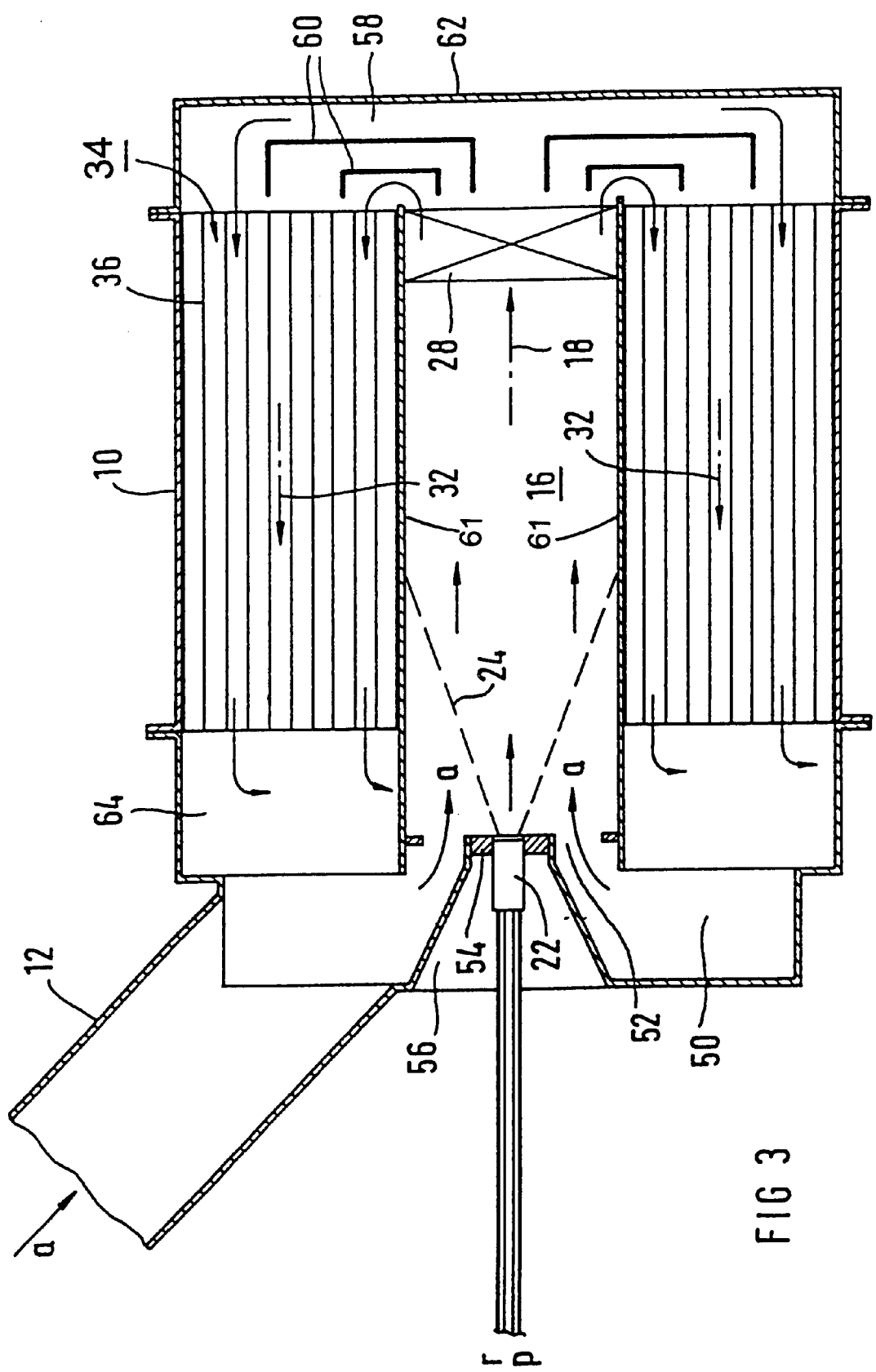
FIG. 3 is a longitudinal section of a first central type catalytic cleaning device with two ducts arranged centrally relative to one another.
Figure 4:
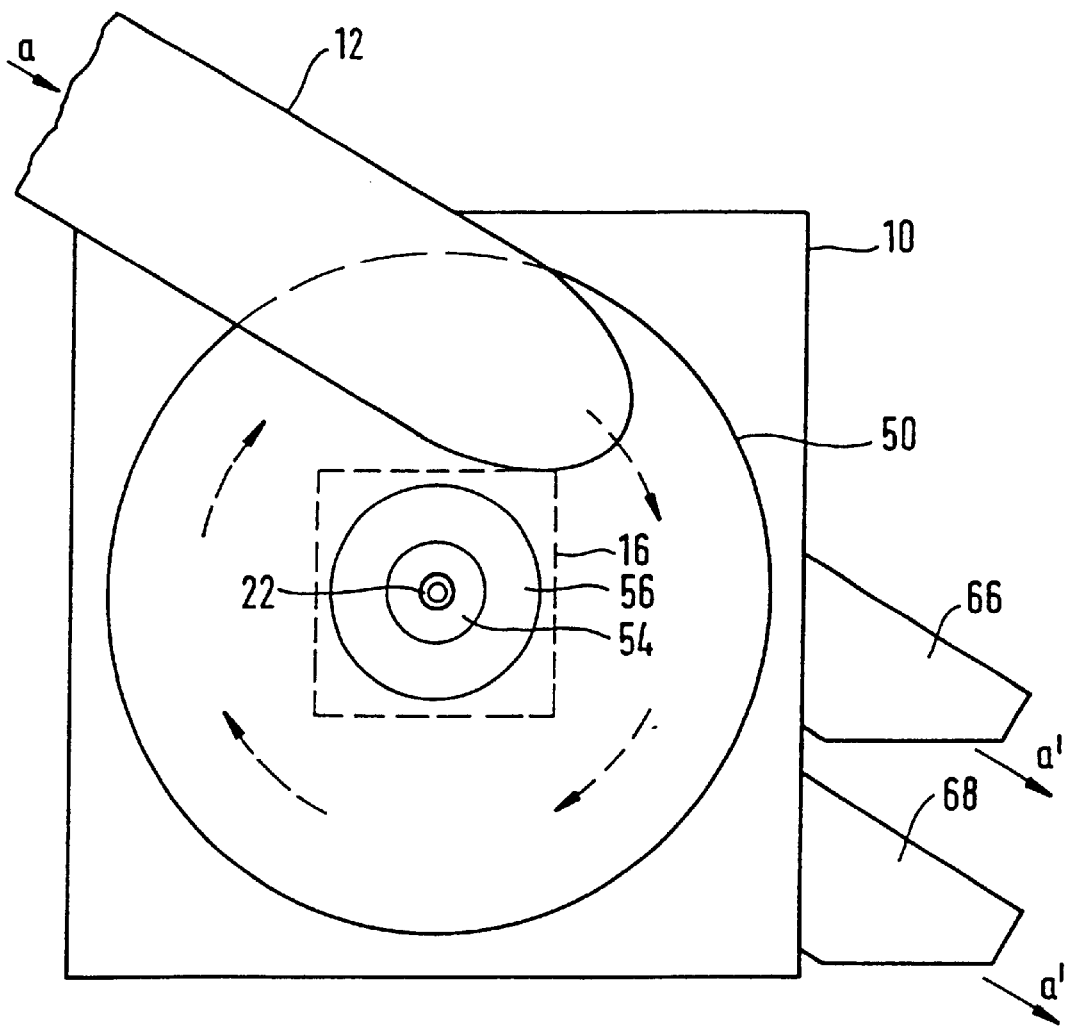
FIG. 4 is an elevational view of the intake side of the cleaning device of FIG. 3.

FIGS. 3 and 4 show a preferred embodiment of a catalytic cleaning device with inflow of the exhaust gas a into a central first duct and backflow through a second duct which embraces the first duct externally and coaxially therewith. In this embodiment, an intake or exhaust gas feed line 12 leads obliquely into an annular prechamber 50. The prechamber 50 could also be constructed to have a circular disk shape. As FIG. 4 shows, in particular, the exhaust gas feed line 12 is arranged at an angle, more precisely in such a manner that the exhaust gas a is put into a rotating (vortex) motion with respect to the longitudinal direction 18 inside the prechamber 50. The annular prechamber 50, centrally to the longitudinal axis 18, has an annular outlet orifice 52 which is formed using a preassembled wall 54. The outlet orifice 52 is simultaneously the inlet for the conversion and mixing duct 16. A feed device 22, that is a two-component atomizer nozzle for reducing agent r and atomizing medium p, is attached to the preassembled wall 54. The spray cone of the atomizer nozzle 22 is designated 24. The structure is made in such a way that a certain free space 56 is present externally for assembly.

The exhaust gas a flows via the outlet orifice 52 into the conversion and mixing duct 16 and mixes there with the atomized reducing agent r.

An optional hydrolysis catalyst 28 may be disposed in the conversion and mixing duct 16.

At the end of the conversion and mixing duct 16, there is also situated here a deflector or deflection chamber 58. It reaches over an annular reaction duct 34 which externally surrounds the conversion and mixing duct 16 and is virtually completely filled with a reduction catalyst 36. Its longitudinal ducts run in parallel to the longitudinal axis 18. To guide the gas mixture, deflection plates or deflection guides 60 can be present in the deflection chamber 58. The conversion and mixing duct 16 can be formed by a tubular sheet wall 61. With certain constructional preconditions relating to the mounting of the reaction catalyst 36 taken into account, the sheet wall 61 can be omitted. The gas in the conversion and mixing duct 16 is then already exposed to the catalytic material on the surface of the catalyst 36.

The back wall 62 of the deflection chamber 58 and the conversion and mixing duct 16, in the present case, therefore, the sheet wall 61, can be internally coated with a catalytically active surface. Likewise, the deflection guides 60 can be coated with a catalytically active layer of this type. This can be a hydrolysis-catalyzing or SCR-catalyzing layer. It has been found that a coating of this type at these points can prevent precipitation of solids and thus blockage.

After flowing through the conversion and mixing duct 16, which may be annular with a rectangular or round cross section, the gas mixture passes into an annular outflow chamber 64 of the same geometry. The outflow chamber 64 is, in the present case, provided with two outflow ducts or outlets 66, 68; in principle, one outlet would also be sufficient. From here, the catalytically cleaned exhaust gas a' can be conducted, if appropriate via further apparatuses (such as heat exchangers, downstream silencers) in the exhaust gas duct, to an exhaust or stack.

Figure 5:
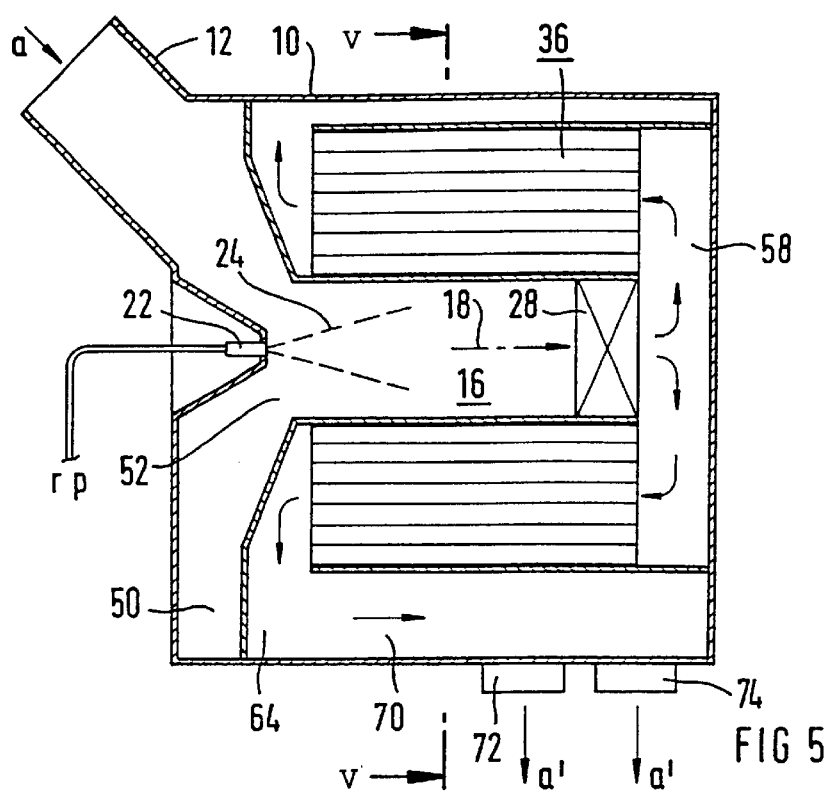
FIG. 5 is a longitudinal section of a second central type catalytic cleaning device with two ducts arranged centrally relative to one another.
Figure 6:
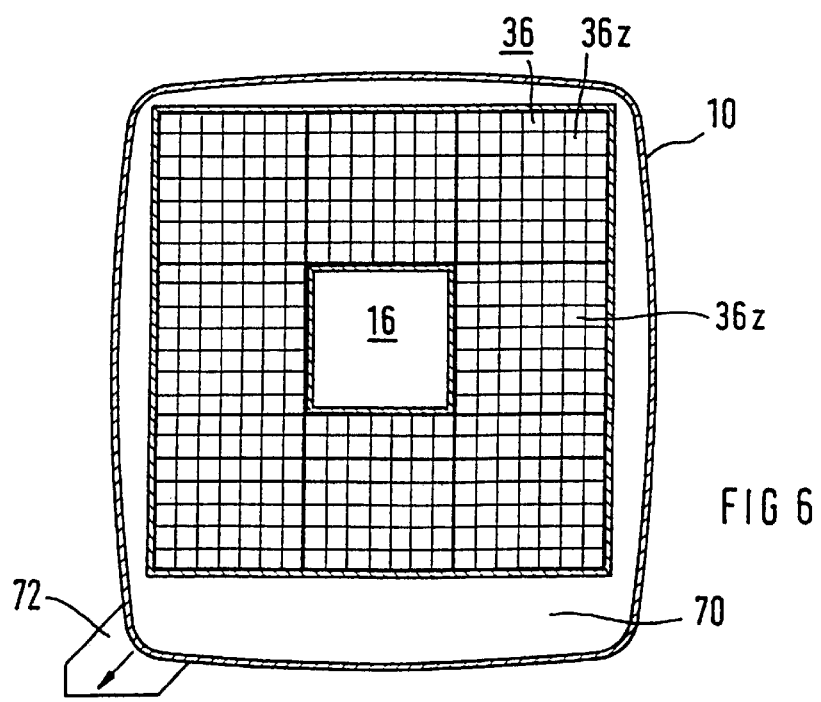
FIG. 6 is a section of the cleaning device of FIG. 5, taken along the line V—V.

The embodiment according to FIGS. 5 and 6 is substantially similar to that of FIGS. 3 and 4. However, the outlet chamber or outflow chamber 64 is not directly provided with one or more outlets in this case. Rather, further deflection takes place at the outlet chamber 64. In other words, the outlet chamber 64 is designed in such a way that the gas stream is deflected in parallel to the longitudinal axis 18 into a silencing chamber 70. The silencing chamber 70 is an annular space which lies outside the conversion and mixing duct 16 containing the SCR catalyst 36. This silencing chamber 70 is, in the present case, provided with two exhaust gas exits or outlets 72, 74, from which the cleaned exhaust gas a' is conducted away. In principle, one outlet would be sufficient here as well. The outer wall of the housing 10 can be additionally coated with a non-illustrated sound-absorbing material in order to reinforce the silencing function of the silencing chamber 70.

In the present case also, a catalytically active coating, preferably an SCR coating, can be provided in the deflection chamber 58 and in the conversion and mixing duct 16.

The two-component atomizing nozzle 22 for the reducing agent r and the atomizing medium p can also in the present case be a commercial nozzle, the spray cone 24 of which forms a preset spray angle. It should be thermally insulated with respect to the housing 10. Superb mixing is induced in this embodiment as well, owing to the swirl which the exhaust gas experiences about the longitudinal axis 18.

In this embodiment, also, the SCR catalyst 36 is formed from individual modules 362. This becomes particularly apparent from FIG. 6. According to this, a total of $(3\times3)-1=8$ such modules having standard dimensions are provided. The modules each have a rectangular, specifically a square, cross section. Instead of this, a rotationally symmetrical configuration may also be chosen. Owing to the modular construction predetermined here, the conversion and mixing duct 16 also has a rectangular, here specifically a square, cross section in the right part. On the left part, in accordance with FIG. 6, the intake area (chamber 50) can be round or rounded. The flow therefore, seen in the direction of flow, changes from a round to a square cross section. The device shown for cleaning the exhaust gas a is designed in particular for use in combination with the diesel engine of a truck.

The following should be further noted with respect to the reduction catalyst 36: it can comprise individual modules (as shown) each stacked one on top of the other, or a plurality of modules arranged one after the other. The individual modules, in the case of the sequential arrangement, can have an intermediate space, which has already been shown in FIG. 2. The intermediate spaces can separate different catalysts from one another. For example, firstly an SCR catalyst module and then an oxidation catalyst module can be respectively used.

Figure 7:
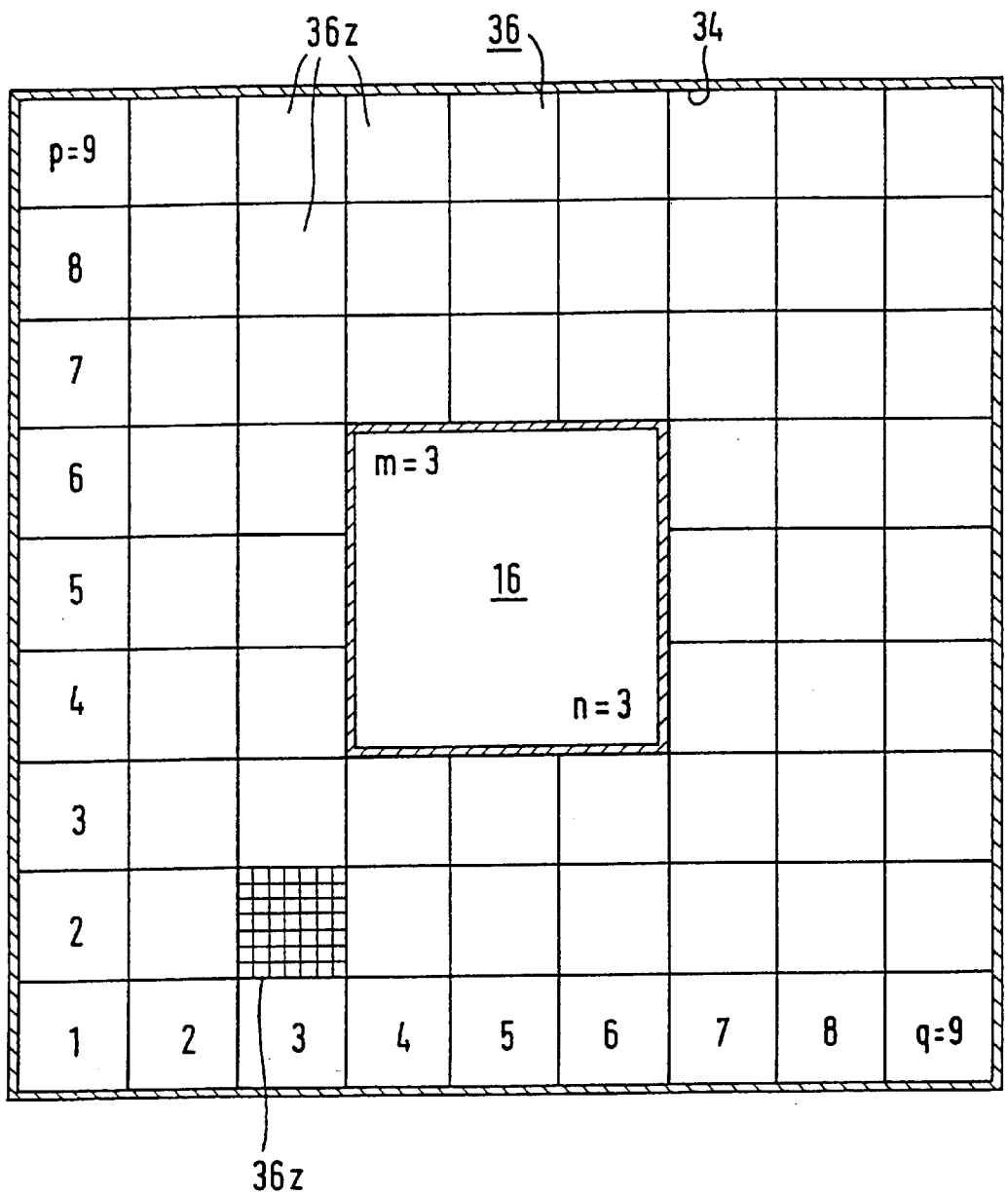
FIG. 7 is a diagrammatic cross section of an arrangement of 72 parallelepipedal catalyst modules in the reaction duct, leaving clear a rectangular central conversion and mixing duct.

FIG. 7 shows a somewhat different type of structure of the catalyst 36. In this case, modules are arranged in $p=9$ rows and $q=9$ columns. In the middle (a central structure is present here) a space for the conversion and mixing duct 16 is left clear. For this, $(m\times n)=3\times3$ modules are omitted, so that in total $(p\times q)-(m\times n)=9\times9-9=72$ modules are distributed over the cross section of the reaction duct 34.

Obviously, arrangements having $3\times3-1=8$, $4\times4-2\times2=12$, $5\times5-3\times3=16$, $6\times6-2\times2=32$, $7\times7-3\times3=40$, $8\times8-4\times4=48$, $10\times10-4\times4=84$ etc. catalyst modules can also be used as alternatives. In this case, it has been selected in each case that $p=q$ and $m=n$. Furthermore, not only are square structures possible, but, in principle, other rectangular structures are also possible, e.g. having $(7\times5)-(3\times3)=26$ modules. $p\neq q$ and/or $m\neq n$ can therefore also be selected.

It becomes clear from this that a rectangular structure can generally have the configuration (p×q)−(m×n) (where p>m, q>n and p, q, m, n are each integers). The duct 36, for which the (m×n) modules have been omitted, is preferably a central duct ("central structure"). However, it need not lie centrally.

However, it must also be emphasized that an overall round or else rounded structure is also possible for the catalyst 36 and thus for the housing 10. In other words: this structure can have a generally round or rectangular conversion and mixing duct 16, one or more annular catalysts 36 and a round outer contour. The annular catalyst 36 is then expediently composed of a number of segmental catalyst modules 362. For example, it can be composed of four quarter-circle segments.

Figure 8:
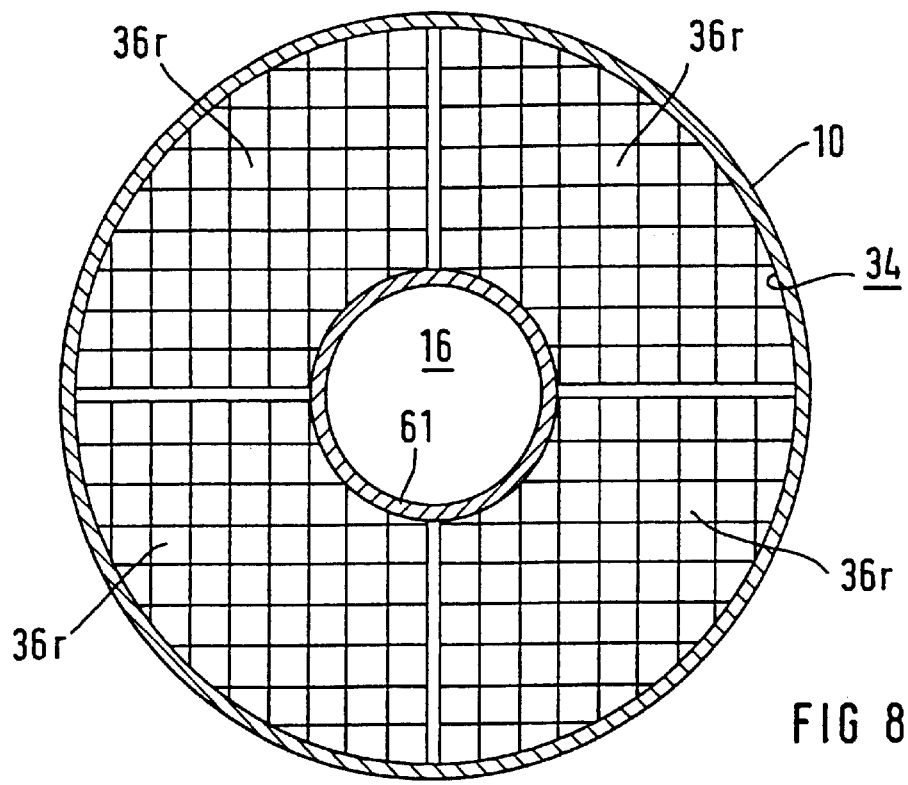
FIG. 8 is a similar view of an arrangement of four circular-segment catalyst modules in the reaction duct, with a round central conversion and mixing duct.

In FIG. 8, a central round conversion and mixing duct 16 is provided. In the surrounding duct 34, which is formed between the tubular sheet wall 61 and the shell or housing 10, there are four identical quarter-circle segmental catalyst modules 36r. In departure therefrom, more modules 36r can also be used, for example eight modules 36r, which each extend over 45°. In the spaces between the individual modules 36r, an adhesive or sealing material, e.g. a ceramic-fiber material, is preferably accommodated. Swelling mats can also be used. These would then surround the modules 36r in the radial direction. The round structure shown has good strength properties.

Figure 9:
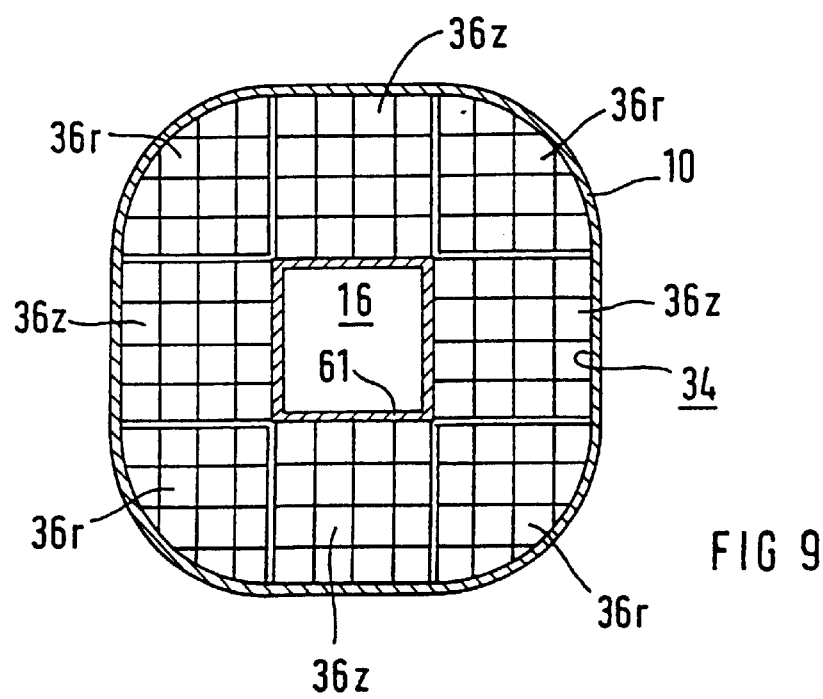
FIG. 9 is a similar view of an arrangement of four parallelepipedal and four circular-segment catalyst modules in the reaction duct, with a rectangular central conversion and mixing duct.

FIG. 9, in contrast, is a rounded structure. Here, the catalyst 36 comprises four identical rectangular catalyst modules 36z and four identical quarter-circle segmental catalyst modules 36r which are respectively arranged in alternation. Larger designs can include more modules 36z and 36r. For example, p>3 rows (e.g. p=12) and q>3 columns (e.g. q=12) can also be provided here. In each of the corners there is then one quarter-circle segmental module 36r or a plurality of segmental modules 36r. The gaps between the modules 36r can likewise be filled with an adhesive or sealing material. Swellable mats can also be used. These embodiments having rounded corners are also particularly stable to mechanical stress.

The reactors (catalyst configurations) of FIGS. 7 to 9 can preferably be used in particular for relatively large plants.

The central-symmetrical construction of the embodiments shown in FIGS. 3 to 9 give the following advantages:

good mixing of the reducing agent with the exhaust gas;

good uniform distribution of the exhaust gas admixed with the reducing agent onto the catalyst(s);

potential for retaining the construction principle with different sizes (scale-up);

potential for modular structure in staged sizes of the same construction principle, use of identical types of components (in particular of catalyst modules, of conversion and mixing ducts);

potential for installation of a hydrolysis catalyst in the (central) intake area (SCR process with urea);

potential for introducing deflection guides 60;

potential for fabricating the deflection guides 60 or the rear wall 62 with catalytically active surfaces, e.g. for hydrolysis or for other catalytic cleaning of exhaust gas;

potential for arranging combined catalysts in the conversion and mixing 16, e.g. of SCR and oxidation catalysts;

good silencing by deflection to rear wall 62 and/or deflection guide 60 and multiple cross section change/reflective surfaces. Potential for introducing additional silencing internals or for shaping the flow ducts in such a way that the effect of a reflection silencer is achieved by interference formation;

use of a two-component atomizing nozzle 22 with appropriate spray angle (approximately 10° to 40°) for injecting a reducing auxiliary, e.g. ammonia or urea, or another reducing agent releasing $NH_3$;

minimizing heat losses by substantial reduction of outer surface area as a result of compact structure;

equalization of the temperature at the critical point for the hydrolysis, that is downstream of the injection;

compact construction by arranging the conversion and the mixing duct in the center of the catalyst space; and good mixing and good reaction conversion rate, since each deflection of the exhaust gas a causes a mixing effect.

We claim:

1. A device for cleaning exhaust gas, a housing having a single duct being a combined conversion and mixing duct defined therein and being formed with an exhaust gas inlet for feeding exhaust gas into said single duct, said single duct defining a longitudinal axis along which the exhaust gas flows through said single duct, said exhaust gas inlet being obliquely angled to the longitudinal axis;

a feed apparatus for injecting a reducing agent into said single duct;

said housing having a reaction duct formed therein extending substantially parallel to said single duct, and including a reducing catalyst disposed in said reaction duct;

a deflector disposed between said single duct and said reaction duct, said deflector deflecting the exhaust gas from the longitudinal direction in said single duct into an opposite direction in said reaction duct; and said housing being formed with an outlet for outflowing cleaned exhaust gas from said reaction duct.

2. The device according to claim 1, wherein said reaction duct surrounds said single duct externally.

3. The device according to claim 1, wherein said feed apparatus is a two-component atomizing nozzle for aqueous urea and compressed air disposed centrally at said inlet of said single duct.

4. The device according to claim 1, which further comprises a further deflector disposed between said reaction duct and said outlet.

5. The device according to claim 1, which further comprises an oxidation catalyst disposed in said reaction duct.

6. The device according to claim 1, which further comprises a hydrolysis catalyst disposed in said housing upstream of said reduction catalyst, relative to a flow of the exhaust gas.

7. The device according to claim 6, wherein said hydrolysis catalyst is disposed in one of said single duct, said deflector, and said reaction duct.

8. The device according to claim 1, wherein said single duct is disposed centrally within said reaction duct.

9. The device according to claim 1, wherein said reducing catalyst is a catalytic converter formed with individual modules, and said single duct has a cross-section selected from the group consisting of rectangular, round, and rectangular with rounded corners.

10. The device according to claim 9, wherein said individual modules have a cross section selected from the group consisting of parallelepiped and circular-segment.

11. The device according to claim 1, wherein said reduction catalyst is an SCR catalyst.

12. The device according to claim 1, wherein said housing is formed with a prechamber disposed between said exhaust gas inlet in said housing and said single duct.

13. The device according to claim 1, wherein said single duct has an intake formed with at least two intake orifices for the exhaust gas.

14. The device according to claim 1, wherein said deflector is provided with a catalytically active surface.

15. The device according to claim 4, wherein said further deflector is provided with a catalytically active surface.

16. The device according to claim 1, which further comprises a silencer in said reaction duct.

17. In combination with a device for cleaning exhaust gas, the device having a single duct being a combined conversion and mixing duct with a longitudinal axis defined therein and an exhaust gas inlet being obliquely angled to the longitudinal axis and a feed apparatus for injecting a reducing agent in the single duct, a reaction duct extending substantially parallel to the single duct, and a deflector disposed between the conversion and mixing duct and the reaction duct, the deflector deflecting the exhaust gas from a flow direction in the single duct into an opposite flow direction in the reaction duct, a catalytic converter, comprising:

a plurality of catalyst modules being locafed in the reaction duct and surroanding the conversion and mixing duct.

18. The combination according to claim 17, wherein said inner duct is disposed centrally within said plurality of catalyst modules.

19. The combination according to claim 17, wherein said modules are rectangular catalyst modules disposed in a checkered pattern along p rows and q columns, and wherein, in the middle area, m×n modules are omitted to form said inner duct, and wherein m, n, p, and q are integers, m<p, and n<q.

20. The combination according to claim 17, wherein said modules are circular-segment catalyst modules defining a circular ring shape of said catalytic converter, wherein said inner duct has a round cross section, and wherein the catalytic converter is insertible into a housing having a round outer contour.

21. The combination according to claim 17, wherein said modules are a plurality of rectangular catalyst modules and a plurality of circular-segment catalyst modules defining a substantially rectangular catalytic converter with rounded corners.

* * * * *